(Model.)
F. J. GROW.
WHEAT FEEDER.
No. 254,957.   Patented Mar. 14, 1882.
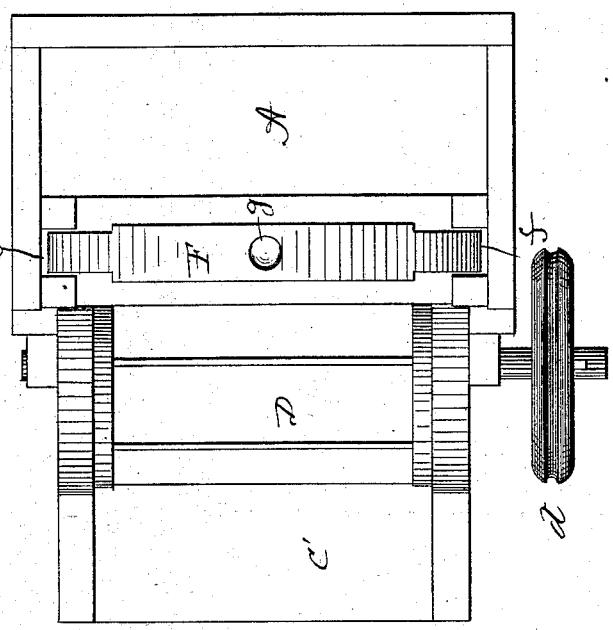
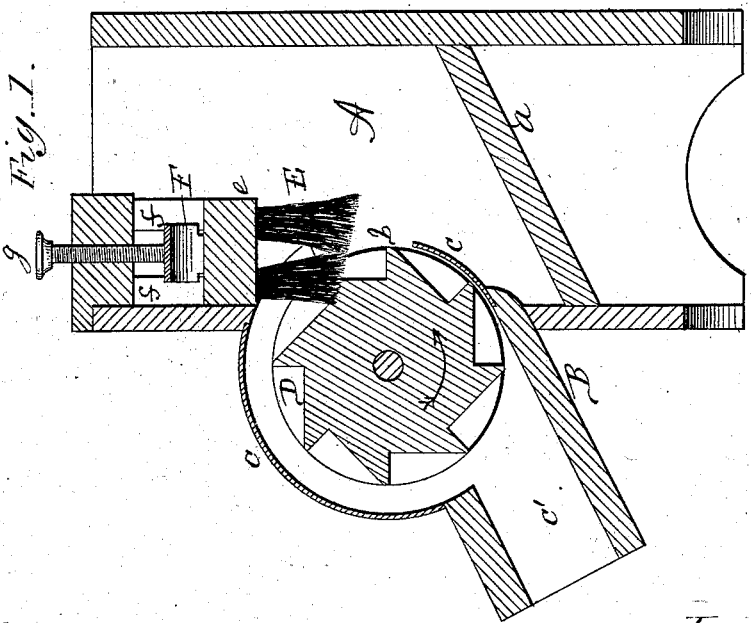
Witnesses  
B. A. Nay.  
Alonzo Gaddy
Inventor.  
Frank J. Grow  
Chas. H. Turton

UNITED STATES PATENT OFFICE.

FRANK J. GROW, OF ALPHA, INDIANA.

WHEAT-FEEDER.

SPECIFICATION forming part of Letters Patent No. 254,957, dated March 14, 1882.

Application filed June 25, 1881. (Model.)

*To all whom it may concern:*

Be it known that I, FRANK J. GROW, a citizen of the United States, residing at Alpha, in the county of Scott and State of Indiana, have invented certain new and useful Improvements in Wheat-Feeders; and I do hereby declare the following to be a full, clear, and exact description of the same, reference being made to the accompanying drawings, forming a part of this specification, and in which—

Figure 1 represents a vertical central section of my invention; Fig. 2, a top view or plan.

My invention relates to certain new and useful improvements in feeders for wheat-mills, having for its object to regulate the flow of wheat into the usual smut-mills from the reservoir or wheat-sink and prevent foreign substances—such as chaff, straw, &c.—from choking or clogging the passage of the grain; and to this end the invention consists in novel features of construction and combination and arrangement of parts, all as will be hereinafter fully described, and specifically designated in the claim.

In the drawings, A represents a wheat reservoir or sink, provided with an inclined bottom, $a$, and side opening, $b$, for the reception of a discharge-spout, B, composed of the segmental curved plates $c\ c$ and spout or flue $c'$.

D represents a grooved roller arranged in the circular portion of said discharge-spout B, and journaled in the sides of said spout, with one of the journals of the roller being extended beyond the side of the spout, and provided with a band wheel or pulley, $d$, for revolving said roller.

E represents a brush arranged on the inside of the reservoir or sink, and adapted to engage with the grooved periphery of said roller D. The brush-block $e$ is provided with a spring, F, having its ends projecting in side guides, $f$, for holding the brush in position, and a thumb-screw, $g$, for adjusting the brush relatively to the roller D, for regulating and equalizing the flow of wheat. The brush also sweeps off from said roller chaff, straw, and other foreign substances, thus preventing their being carried into the discharge-spout, and thereby obviating clogging or choking of the discharge-spout, while keeping them out of the smut-mill.

The operation of my improved feeder is obvious from the foregoing. The periphery of the feed-roller, extending into the reservoir or sink, will, upon being revolved in the direction of the arrow, Fig. 1, carry the wheat around and discharge it into the flue $c'$, which is arranged to communicate with the smut-mill, while the brush will sweep off from said roller back into the reservoir or sink chaff, straw, and other foreign substances that tend to clog or choke the discharge-spout. By raising or lowering the brush through the medium of the set-screw $g$ the flow of wheat is regulated.

Having thus fully described my invention, what I claim as new, and desire to secure by Letters Patent, is—

The combination, with the reservoir or sink A, having side opening, $b$, of the discharge-spout having circular portion $c\ c$ and flue $c'$, the grooved roller arranged in said circular portion, with its periphery projecting into said reservoir, and an adjustable brush arranged in said reservoir and engaging with the periphery of the roller, substantially in the manner as and for the purpose herein shown and described.

FRANK J. GROW.

Witnesses:
CHAS. F. LURTON,
JAMES H. BILSER.